(12) United States Patent
Cheng et al.

(10) Patent No.: US 8,575,235 B2
(45) Date of Patent: Nov. 5, 2013

(54) REMOVABLE HYDROPHOBIC COMPOSITION, REMOVABLE HYDROPHOBIC COATING LAYER AND FABRICATION METHOD THEREOF

(75) Inventors: Hung-Chiao Cheng, Hsinchu (TW); Wen-Hann Chou, Sinjhuang (TW); Yeu-Kuen Wei, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 357 days.

(21) Appl. No.: 12/813,710

(22) Filed: Jun. 11, 2010

(65) Prior Publication Data

US 2010/0317780 A1 Dec. 16, 2010

Related U.S. Application Data

(60) Provisional application No. 61/186,400, filed on Jun. 12, 2009.

(30) Foreign Application Priority Data

May 28, 2010 (TW) .............................. 99117307 A

(51) Int. Cl.
*C08L 91/06* (2006.01)
(52) U.S. Cl.
USPC ........................... 523/212; 106/271; 106/272
(58) Field of Classification Search
USPC .................................. 106/271, 272; 523/212
See application file for complete search history.

(56) References Cited

U.S. PATENT DOCUMENTS

| | | | |
|---|---|---|---|
| 2,786,042 A | 3/1957 | Iler | |
| 3,931,428 A | 1/1976 | Reick | |
| 5,136,074 A | 8/1992 | Shirahata | |
| 5,651,921 A | 7/1997 | Kaijou | |
| 6,025,455 A | 2/2000 | Yoshitake et al. | |
| 6,649,222 B1 | 11/2003 | D'Agostino et al. | |
| 6,767,984 B2 | 7/2004 | Toui et al. | |
| 6,994,045 B2 | 2/2006 | Paszkowski | |
| 7,238,751 B2 | 7/2007 | Wang et al. | |
| 7,258,731 B2 | 8/2007 | D'Urso et al. | |
| 7,342,551 B2 | 3/2008 | King | |
| 7,391,018 B2 | 6/2008 | Niu et al. | |
| 7,419,615 B2 | 9/2008 | Strauss | |
| 7,473,658 B2 | 1/2009 | Acosta et al. | |
| 7,485,343 B1 | 2/2009 | Branson et al. | |
| 2006/0110542 A1* | 5/2006 | Dietz et al. ..................... 427/384 |
| 2006/0147705 A1 | 7/2006 | Huang et al. |
| 2008/0127856 A1* | 6/2008 | Hasinovic ........................ 106/10 |
| 2008/0245767 A1 | 10/2008 | Kim et al. |
| 2009/0017301 A1* | 1/2009 | Moireau ........................ 428/372 |

FOREIGN PATENT DOCUMENTS

| TW | 289540 B1 | 1/2006 |
| TW | 200807550 | 2/2008 |
| TW | 200827416 | 7/2008 |
| TW | I310779 | 6/2009 |
| TW | 201020288 A | 1/2010 |
| WO | WO 2008/153687 | 12/2008 |

OTHER PUBLICATIONS

English language translation of abstract of TW 200807550 (published Feb. 1, 2008).
English language translation of abstract of TW I310779 (published Jun. 11, 2009).
Bhagat, S.D., et al.; "Room Temperature Synthesis of Water Repellent Silica Coatings by the Dip Coat Technique;" Applied Surface Science; No. 253; 2006; pp. 2217-2221.
Latthe, S.S., et al.; "TMOS Based Water Repellent Silica Thin Films by Co-Precursor Method Using TMES as a Hydrophobic Agent;" Applied Surface Science; No. 255; 2009; pp. 3600-3604.
Rao, A.V., et al.; "Preparation of MTMS Based Transparent Superhydrophobic Silica Films by Sol-Gel Method;" Journal of Colloid and Interface Science; No. 332; 2009; pp. 484-490.
English language translation of abstract of TW 289540.
English language translation of abstract of TW 200827416 (p. 3 of publication).
English language translation of abstract of TW 201020288 (p. 3 of publication).
English language translation of abstract of TW 289540., Jan. 2006.
English language translation of abstract of TW 200827416 (p. 3 of publication)., Jul. 2008.
English language translation of abstract of TW 201020288 (p. 3 of publication)., Jan. 2010.

* cited by examiner

*Primary Examiner* — Margaret Moore
(74) *Attorney, Agent, or Firm* — McClure, Qualey & Rodack, LLP

(57) ABSTRACT

A removable hydrophobic composition, a removable hydrophobic coating layer and a fabrication method thereof are provided. The removable hydrophobic composition comprises 0.1-50 parts by weight of nano-particles having diameters smaller than 100 nm and of which surfaces are modified with silicon hydride compound, 0.1-5 parts by weight of an adhesion regulator or adhesion inhibitor, 100 parts by weight of a solvent, and 0.1-50 parts by weight of a polymer compound.

10 Claims, 2 Drawing Sheets

REMOVABLE HYDROPHOBIC COMPOSITION, REMOVABLE HYDROPHOBIC COATING LAYER AND FABRICATION METHOD THEREOF

This application claims the benefit of U.S. provisional application Ser. No. 61/186,400, filed Jun. 12, 2009 and Taiwan application Serial No. 99117307, filed May 28, 2010, the subject matter of which is incorporated herein by reference.

BACKGROUND OF THE INVENTION

1. Field of the Invention

The invention relates in general to a hydrophobic composition, and hydrophobic coating layer and fabrication method thereof, and particularly to a removable hydrophobic composition, and removable hydrophobic coating layer and fabrication method thereof.

2. Description of the Related Art

Surfaces of many articles for daily use, consumer electronic products, traffic implements, musical instruments, sports apparatus, porcelain or decorations need to be protected by a hydrophobic treating. However, current methods for forming hydrophobic protecting films needs professional skills, and they would not be carried out by general people. For example, methods for forming hydrophobic protecting films need thermal curing or ultraviolet curing processes. Otherwise, rough surfaces that are hydrophobic are formed by chemical treating processes or etching processes. Therefore, products with hydrophobic surfaces that sold to and used by consumers are often made by manufacturers, since it is hard for consumers to fabricate hydrophobic protecting films In addition, hydrophobicity of hydrophobic protecting films used for a long period would gradually decrease, and therefore an old hydrophobic protecting film needs to be replaced with a new hydrophobic protecting film. However, current hydrophobic protecting films made by manufacturers are not easily removed directly. Acute methods such as mechanical polishing or heat melting methods are needed to remove the hydrophobic protecting films. The removing methods need extremely professional skills and equipments, and they would easily cause serious damages to materials.

Coating materials that used for forming hydrophobic layers usually contain fluorine, since fluorine that has a low surface potential characteristic would cause a hydrophobic effect. However, Directive 76/769/EEC of the European Parliament severely restrict using of fluorides, such as perfluorooctanoic acid (PFOA), perfluorooctane sulfonate (PFOS) derivatives, etc. Perfluorooctane sulfonate is one of perfluorinated compounds. Perfluorooctane sulfonate has a good thermostability, and is not easily destroyed in the environment. In addition, perfluorooctane sulfonate is tolerant of water and oil. Perfluoro-octanoic acid (PFOA) and salts of which are one other kind of perfluorinated compounds. PFOA and derivatives of which are applied to treating surfaces of household products such as Teflon Diplomat cooking utensils, convenient food packages, anti-dust fibers and fireproof foam materials. Perfluorinated compounds are harmful to human and animals as they would accumulate in living organic bodies. Thus, the European Parliament has estimated risks, developed safe substitutes, and defined plans for decreasing products and usage.

Hydrophobic protecting films can be obtained by forming rough structures on surfaces of substrate materials and using materials not containing fluorine and having low surface potentials. U.S. Pat. No. 2,786,042 discloses a modified hydrophobic material not containing fluorine (1957). Hydrophobic powders are obtained by modifying surfaces of micro silica structures with C1~20 silane. U.S. Pat. No. 5,136,074 discloses stable modified powders formed by silylating powders with modifying agents comprising trimethylchlorosilane or t-butyldimethylchlorosilane. U.S. Pat. No. 5,651,921 discloses hydrophobic materials formed by replacing OH groups with organic compounds on silane-modified surfaces of silica materials by using modifying agents comprising organic group-substituted halosilanes, organic group-substituted alkoxysilanes, organic group-substituted silazanes and hydrolyzates. U.S. Pat. No. 6,025,455 discloses modifying OH groups with alkyl functional group on surfaces of silica materials by using materials comprising disiloxane and monosiloxane. The reference teaches using solvents to form a coating material used for forming a hydrophobic layer, and the hydrophobic layer is formed by coating and curing the coating material. U.S. Pat. No. 6,767,984 discloses a composition of a hydrophobic protecting coating material coated on a surface of a car by modifying by grafting a polymer material and silane. In Applied Surface Science, vol. 253, pages 2217~2221, 2006, a hydrophobic surfaces is obtained by modifying silane with Hexamethyldisilazane. In Applied Surface Science, vol. 255, pages 3600~3604, 2009, a transparent and hydrophobic layer is obtained by modifying a surface of silane material with Trimethylethoxysialne compound. In Journal of Colloid and Interface Science, vol. 332, pages 484~490, 2009, a hydrophobic layer that can sustain a high humidity environment for one month is obtained by using hexamethyldisilazane and methyltrimethoxysilane.

WO 2008/153687 discloses a coating composition with powders which surfaces are modified with materials having a low surface potential. A hydrophobic layer can be formed by directly coating the coating composition on a surface of a substrate material. However, the hydrophobic layer has a weak adhesion strength and non-stable problem. TW I310779 discloses using epoxy resin as hydrophobic powders and adhesion agent applied between substrates. The hydrophobic layer is attached to the substrate with strong adhesion strength and is not easily removed. TW 96121473 discloses using a polyacrylic ester as a dirt-proof and waterproof adhesion agent that has a high transparency and durable characteristic. The hydrophobic layer formed by using the coating material is hardly removed. The hydrophobic layer is usually removed with professional skills and equipments, such as mechanical polishing or heat melting method.

In some cases, paraffin having a hydrophobic characteristic intrinsically is used to fabricate a hydrophobic protecting layer. However, such coating material easily has non-uniformly-mixing problem with powders. In addition, hydrophobic powders are fully covered by the paraffin, and thus they could not perform the hydrophobic characteristic. Therefore, a hydrophobicity of the hydrophobic layer is extremely decreased.

SUMMARY OF THE INVENTION

According to a first aspect of the present invention, a removable hydrophobic composition is provided. The removable hydrophobic composition comprises 0.1-50 parts by weight of nano-particles; 0.1-5 parts by weight of an adhesion regulator or adhesion inhibitor; 100 parts by weight of a solvent; and 0.1-50 parts by weight of a polymer compound. The nano-particles have diameters smaller than 100 nm. Surfaces of the nano-particles are modified with silane compound.

According to a second aspect of the invention, a method for fabricating a removable hydrophobic coating layer is provided. The method is described as following. The said removable hydrophobic composition is provided. The removable hydrophobic composition is applied onto a surface of a substrate. After evaporating the solvent of the removable hydrophobic composition, the removable hydrophobic composition forms a removable hydrophobic coating layer on the surface of the substrate.

According to a third aspect of the invention, a removable hydrophobic coating layer is provided. The removable hydrophobic coating layer is formed by said method.

The invention will become apparent from the following detailed description of the preferred but non-limiting embodiments. The following description is made with reference to the accompanying drawings.

DETAILED DESCRIPTION OF THE INVENTION

Figure 1:
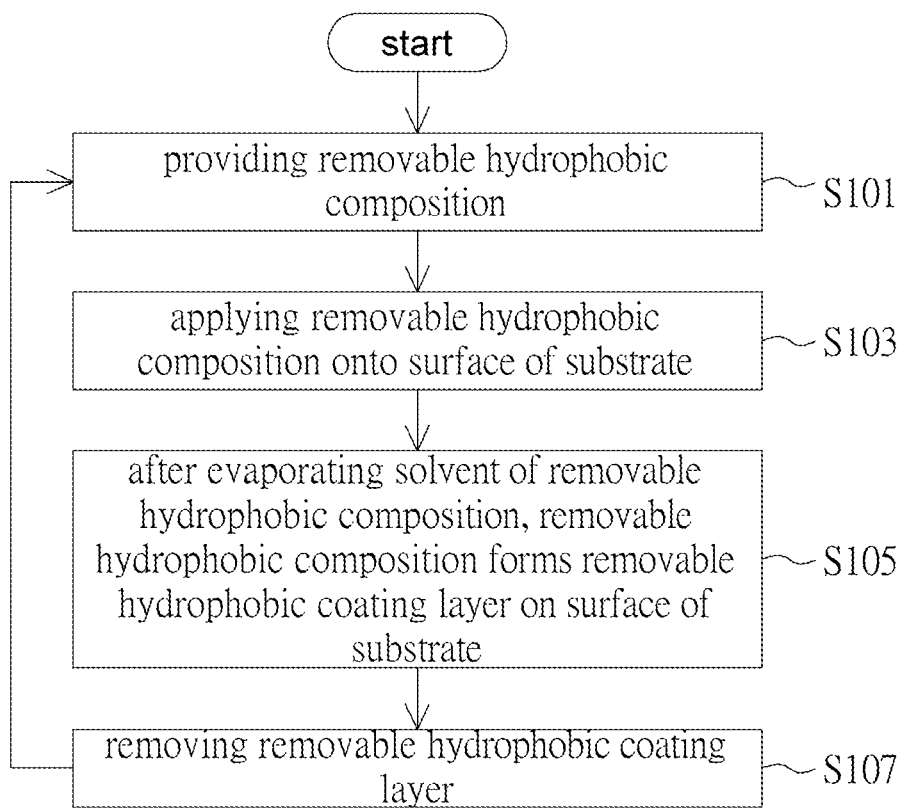
FIG. 1 illustrates a process flow for fabrication the removable hydrophobic coating layer in one embodiment of the present invention.

The present invention provides a removable hydrophobic composition, and removable hydrophobic coating layer and fabrication method thereof. The removable hydrophobic composition and removable hydrophobic coating layer does not contain a harmful ingredient—fluorine compound and has an outstanding hydrophobic effect. A number of embodiments are disclosed below for more detailed description of the invention. However, the embodiments disclosed below are for exemplification only, not for limiting the scope of protection of the invention.

Removable Hydrophobic Composition

The removable hydrophobic composition of the present invention comprises (a) 0.1-50 parts by weight of nano-particles, (b) 0.1-5 parts by weight of an adhesion regulator or adhesion inhibitor, (c) 100 parts by weight of a solvent, and (d) 0.1-50 parts by weight of a polymer. The nano-particles have diameters smaller than 100 nm and of which surfaces are modified with silane compound.

In embodiments of the present invention, the nano-particles comprise a titanium oxide, zinc oxide, aluminum oxide, silicon oxide, mica, derivatives thereof or combinations thereof. The silane compound comprises hexamethyldisilazane, dimethyldichlorosilane, octyltrimethoxysilane, octamethyl cyclotetrasiloxane, ethoxy silane compound, polydimethysiloxane, tetramethyltetravinyl-cyclotetrasiloxane, derivatives thereof or combinations thereof. The silane compound can modify the surfaces of the nano-particles with chemical bonds (such as chemical bonds generated by hydrolysis) so as to improve the hydrophobicity of the surfaces of the nano-particles.

The nano-particles with silane compound-modified surfaces are commercial products, or fabricated from a purchased semi-finished goods or original materials. The nano-particles can be fabricated by sol-gel method, vapor reaction method, hydro-thermal method, deposition method, physical crumbling method, mechanical ball polishing method, chemical vapor deposition method, micro-emulsion method, electro-chemistry method, etc. The sol-gel method comprises consolidating a metal compound from a solution, sol, gel. The consolidated metal compound is treated with a low temperature process to form the nano-particles. The sol-gel method has advantages that it can be applied to many kinds of materials, the product has uniform size, and the process can be controlled easily. The fundamental theorem of the vapor reaction method, which is one of the main synthetic technologies currently, is that when atom or molecule vapors are super-saturated, they would nucleation precipitate into a solid phase or liquid phase. The cooling rate of homogeneous nucleation in vapor phase can be controlled to gradually form the nano-particles of, for example, pure metal, ceramics or composite material. A nano-scale material such as thin film, whisker crystal or carbon tube, etc. can be formed on a solid substrate by nucleation growth with a slow cooling rate. The vapor reaction method has advantages that the process is clean, and the size of nano-particles is easily controlled. When researching, it is need to use nano-particles having specific characteristics. The vapor evaporating method is an appropriate method for forming metal, alloy, ceramics, composite, organic nano-particles. The surfaces of nano-particles can be modified with silane compound by performing chemically bonding between the silane compound and the nano-particles.

The solvent comprises an alkane, aromatic, alcohol, ketone, ester, ester derivative or combinations thereof. For example, the solvent comprises ethanol, Isopropyl alcohol, butane, heptane, hexane, acetone, butanone, methyl ethyl ketone (MEK), toluene, dimethylbenzene, ethyl acetate, butyl acetate, amyl acetate, derivatives thereof or combinations thereof. The appropriate solvent can be used for well dispersing the nano-particles in the removable hydrophobic composition. The nano-particles would be stably suspended in the removable hydrophobic composition and not easily aggregated. The nano-particles would not rapidly precipitate. The volatility of the solvent helps the nano-particles in the removable hydrophobic composition to uniformly spread on the surface of the substrate, and therefore the hydrophobic effect of the removable hydrophobic coating layer is improved.

Using the adhesion regulator or adhesion inhibitor helps the removable hydrophobic composition have a proper adhesive characteristic and the removable hydrophobic coating layer have a removable characteristic. The adhesion regulator used in embodiments of the present invention can be used as a binder for improving the adhesion strength between the nano-particles and the surface of the substrate. The adhesion regulator comprises paraffin wax, carnauba wax, bee wax, polyethylene wax, derivatives thereof or combinations thereof. The polymer compound comprises polyethylene, polypropylene, polyvinyl acetate, acrylic resin, polyvinyl chloride, polystyrene, silicone rubber resin, epoxy resin, polyurethane resin, derivatives thereof or combinations thereof. The removable hydrophobic composition of embodiments of the present invention only has a small ratio of the adhesion regulator or adhesion inhibitor. Therefore, the sticky adhesion regulator would not seriously influence the dispersing condition of the nano-particles. In addition, the nano-particles would not be entirely covered by the paraffin. Thus, the nano-particles would be uniformed mixed in the removable hydrophobic composition and perform the intrinsic hydrophobic characteristics. Moreover, the formed removable hydrophobic coating layer can be easily removed due to the adhesion regulator.

In some embodiments of the present invention, the removable hydrophobic composition may further comprise a polymer plasticity-adjusting agent. The polymer plasticizers may comprise polyglycol, polytetramethylene ether glycol, polycaprolactone polyol, di-n-octyl phthalate, triacetylgycerol, trimethyl 1,3 pentanediol, derivatives thereof or combinations thereof.

Removable Hydrophobic Coating Layer and Fabrication Method Thereof

FIG. 1 illustrates a process flow for fabrication the removable hydrophobic coating layer in one embodiment of the present invention. The method comprises (a) step S101: providing the removable hydrophobic composition; (b) step S103: applying the removable hydrophobic composition onto a surface of a substrate; and (c) after evaporating the solvent of the removable hydrophobic composition, the removable hydrophobic composition forms a removable hydrophobic coating layer on the surface of the substrate.

In step S103, the removable hydrophobic composition can be applied onto the surface of the substrate by coating method such as spin-coating method, immersion coating method, spray coating method, paint coating method, scrape coating method, brush coating method, roll kiss coating method, etc. The substrate on which surface can be coated with the removable hydrophobic composition of the present invention comprises a glass, ceramics, rock, plastics, metal or polymer, etc. In addition, other appropriate materials and composite materials thereof can also be used.

The removable hydrophobic composition of embodiments of the present invention can be coated onto many kinds of the substrates, and the removable hydrophobic coating layer formed by using the removable hydrophobic composition has hydrophobic effect. Therefore, the removable hydrophobic composition of embodiments of the present invention can be applied to many articles for daily use, consumer electronic products, traffic implements, musical instruments, sports apparatus, porcelain, decorations, etc. For example, the removable hydrophobic composition of embodiments of the present invention can be used for maintaining leather of a leather bag or leather shoes; forming a scrape-proof protecting layer for a personal electronic product or a screen; cleaning and protecting treating for a surface of a car; grind-proof and hydrophobic treating for a surface of a tile; lacquering and protecting treating for a surface of an decorations; fingerprint-proof and water-proof treating for a surface of a musical instrument; water-proof coating treating for a surface of a sports apparatus; etc.

In one embodiment, in step S105, after the surface of the substrate is coated with the removable hydrophobic composition, the solvent in the removable hydrophobic composition can be evaporated out by a natural wind in the room temperature to form the removable hydrophobic coating layer. A convection tool, such a fan, electric fan, blower, etc., can also be used to accelerate the drying rate. Note that the removable hydrophobic coating layer can be fabricated by using the removable hydrophobic composition of embodiments of the present invention with a simple convection tool in the room temperature condition. Special or professional heating or UV-curing equipments are not necessary. Therefore, the using method of the invention is very simple. The products can be sold and easily used by any kind of customer.

The method for fabricating the removable hydrophobic coating layer of embodiments of the present invention may further comprise step S107: removing the removable hydrophobic coating layer. A user may prefer to renew a removable hydrophobic coating layer since the hydrophobic effect of which gradually degrades during a long using time. Since the removable hydrophobic composition of embodiments of the present invention contains the polymer compound and a small ratio of the adhesion regulator or adhesion inhibitor (or paraffin), the formed removable hydrophobic coating layer is a removable film. The removable hydrophobic coating layer looks like a transparent wrapping paper closely attached to the surface of the substrate. The removable hydrophobic coating layer can be easily removed from the surface of the substrate by a gentle method such as ripping, rinsing, brushing, etc. Thus, the damage degree of the surface of the substrate is minimized. After removing the removable hydrophobic coating layer, another the removable hydrophobic composition can be coated onto the surface of the substrate to form another the removable hydrophobic coating layer. Accordingly, a user himself can renovate the removable hydrophobic coating layer on the surface of the substrate by an easy method after the hydrophobicity of the removable hydrophobic coating layer decreases. In addition, removing process seldom damages the surface of the substrate.

EXAMPLE AND COMPARATIVE EXAMPLE

The advantages of the present invention are illustrated with the following examples of the present invention and comparative examples.

Example 1

0.5 g silicon oxide nano-particles (with a diameter of 7 nm) surfaces of which are modified with hexamethyldisilazane, 0.5 g paraffin wax and 100 ml butyl acetate are mixed and heated to 60 to uniformly mixed. Then, 0.5 g PMMA is added to the solution and stirred in the room temperature until dissolved so as to obtain a removable hydrophobic composition. The removable hydrophobic composition is installed in a pneumatic-type sprayer and then sprayed onto a surface of a glass substrate. A removable hydrophobic coating layer is obtained after the solvent of the removable hydrophobic composition is dried out.

Example 2

A removable hydrophobic coating layer is obtained by a method similar to that of example 1, except that the paraffin wax is replaced with carnauba wax.

Comparative Examples 1 to 2

Hydrophobic layers are obtained by a method similar to that of example 1, except that the content of the hydrophobic composition is replaced with that shown in table 1.

TABLE 1

| | examples 1 to 2 and comparative examples 1 to 2 | | | |
|---|---|---|---|---|
| | example 1 | comparative example 1 | comparative example 2 | example 2 |
| nano-particles (+silane compound modifying surfaces of nano-particles) | 7 nm silicon oxide (+hexamethyldisilazane) 0.5 g | 7 nm silicon oxide (+hexamethyldisilazane) 0.5 g | 7 nm silicon oxide (+hexamethyldisilazane) 0.5 g | 7 nm silicon oxide (+hexamethyldisilazane) 0.5 g |

TABLE 1-continued examples 1 to 2 and comparative examples 1 to 2

|  | example 1 | comparative example 1 | comparative example 2 | example 2 |
| --- | --- | --- | --- | --- |
| paraffin | paraffin wax 0.5 g | non | non | carnauba wax 0.5 g |
| polymer compound | PMMA 0.5 g | PMMA 0.5 g | thermosetting PU 0.5 g | PMMA 0.5 g |
| solvent | butyl acetate 100 Ml | butyl acetate 100 mL | butanone 100 mL | butyl acetate 100 mL |
| look of coating layer | light white and slight shine | light white and rough surface | light white and rough surface | light yellow and crowd-of-isl and shape surface |
| water contact angle | 141.6 ± 1.6 degrees | 126.5 ± 9.7 degrees | 94.1 ± 0.5 degrees | 138.3 ± 3.9 degrees |
| stability of coating layer | removable hydrophobic coating layer stably adheres to substrate after having been immersed in water for 24 hours | hydrophobic layer stably adheres to substrate after having been immersed in water for 24 hours | hydrophobic layer stably adheres to substrate after having been immersed in water for 24 hours | island shape portions of removable hydrophobic coating layer stably adheres to substrate after having been immersed in water for 24 hours |
| way for remove coating layer | removable hydrophobic coating layer can be directly removed by wiping with a dry tissue | hydrophobic layer can entirely removed only by using solvent | hydrophobic layer can not removed only by wiping or using solvent | removable hydrophobic coating layer can be directly removed by wiping with a dry tissue |
| re-coating | after removable hydrophobic coating layer is removed, another new removable hydrophobic composition can be coated onto substrate | after hydrophobic layer is removed, another new hydrophobic composition can be coated onto substrate | another new hydrophobic composition can not be coated onto substrate | after removable hydrophobic coating layer is removed, another new removable hydrophobic composition can be coated onto substrate |

The removable hydrophobic composition of the present invention contains a small ratio of the adhesion regulator or adhesion inhibitor (or paraffin). Therefore, the adhesive agent and adhesive characteristics would be influenced. In comparative examples 1 to 2, the hydrophobic layer formed from the coating layer without any paraffin is strongly adhered to the surface of the substrate, and removing the removable hydrophobic coating layer is achieved by only violent methods. In examples 1 to 2, the removable hydrophobic coating layer formed from the coating layer containing a small ratio of the adhesion regulator or adhesion inhibitor (or paraffin) can be removed merely by wiping with a tissue. Solvents or other violent methods are not need. In addition, the hydrophobic effect of the removable hydrophobic coating layer of examples is superior to that of comparative examples.

Table 2 shows results of comparative examples 3 to 6. The comparative examples 3 to 6 do not use the polymer compound. In addition, there is no chemical bond reaction between the surface-modified nano-particle and the adhesion regulator. In the comparative examples 3 to 6, the hydrophobic composition is obtained by well mixing 0.5 g silicon oxide nano-particles (diameter of 7 nm) surfaces of which are modified with hexamethyldisilazane, 0.5 g paraffin wax and 100 ml isopropanol at the room temperature. Then, the hydrophobic composition is installed in a pneumatic-type sprayer and then sprayed onto a surface of a glass fiber substrate. A hydrophobic coating layer is obtained after the solvent of the hydrophobic composition is dried out.

Figure 2:
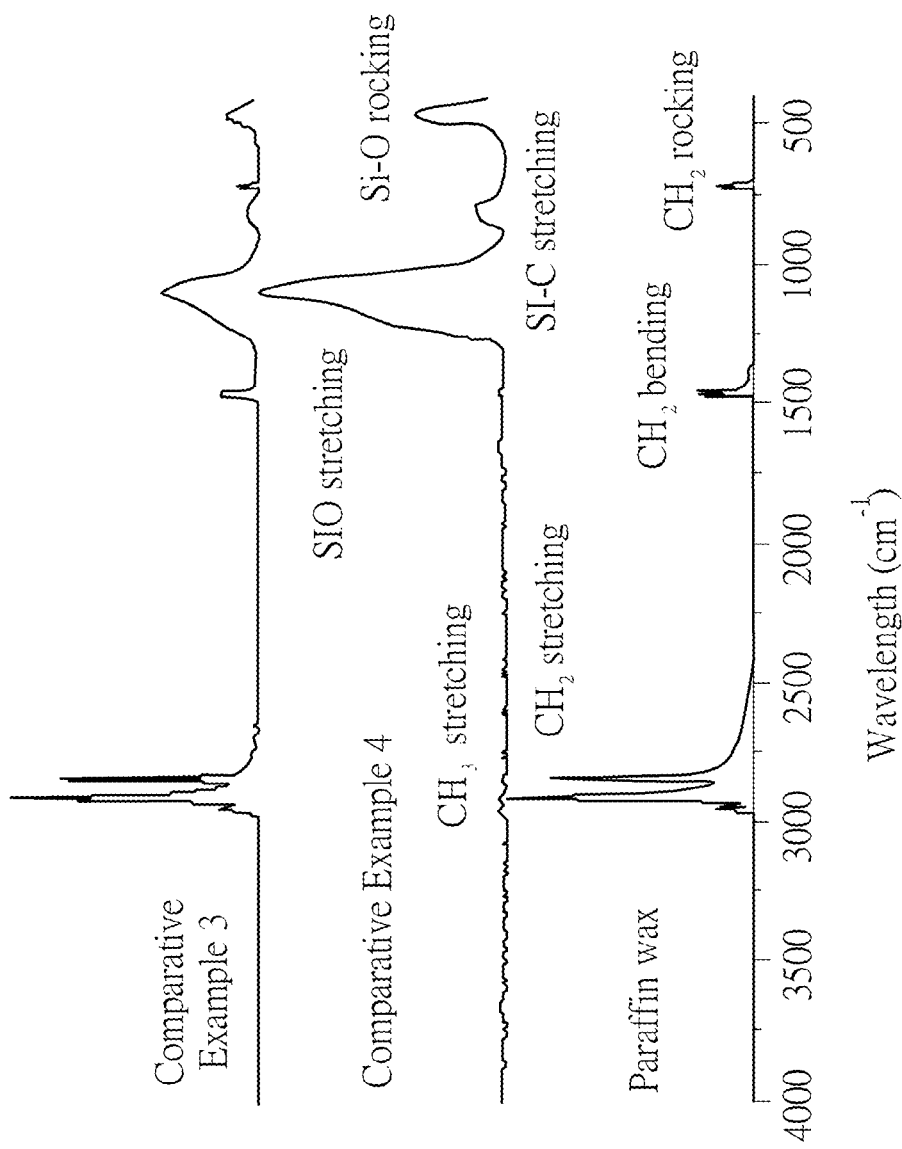
FIG. 2 shows infrared spectroscopy results of the hydrophobic coating layer of comparatives and a paraffin wax.

FIG. 2 shows infrared spectroscopy results of the hydrophobic layer of comparative example 3, the hydrophobic layer of comparative example 4 and a paraffin wax. From FIG. 2, it is found that adding the paraffin wax does not influent the absorption peak position of the nano-particles. Therefore, it is proved that there is no chemical bond effect between the paraffin and the nano-particles. That is the reason why, even using the paraffin, the nano-particles surfaces of which are modified with the silane compound still can perform theirs hydrophobic characteristic. Further, the hydrophobicity of the hydrophobic layer using the paraffin of comparative example 3 is substantially superior to that of comparative example 4.

The removable hydrophobic coating layer of the present invention has both stable adhesion effect and removable characteristic. The removable hydrophobic coating layer can be used in wide applications such as waterproof, high-wet salting resistance and easily-cleaned surface capabilities for traffic implements, buildings, outdoor machine elements, personal electronic products. The removable hydrophobic coating layer used for an outdoor machine element would have a decreased hydrophobic effect after being used for a long time. Therefore, the aged removable hydrophobic coating layer needs to be removed to form another new the removable hydrophobic coating layer. Alternatively, electric elements are sometimes modified in processes, and therefore it is need to remove the removable hydrophobic coating layer and form another new the removable hydrophobic coating layer.

TABLE 2

| | comparative examples 3 to 6 | | | |
|---|---|---|---|---|
| | comparative example 3 | comparative example 4 | comparative example 5 | comparative example 6 |
| nano-particles (+silane compound modifying surfaces of nano-particles) | 7 nm silicon oxide (+hexamethyldisilazane) 0.5 g | 7 nm silicon oxide (+hexamethyldisilazane) 0.5 g | 7 nm silicon oxide (+non) 0.5 g | non |
| paraffin | paraffin wax 0.5 g | non | paraffin wax 0.5 g | paraffin wax 0.5 g |
| solvent | isopropanol 100 mL | isopropanol 100 mL | isopropanol 100 mL | isopropanol 100 mL |
| water contact angle | 138.7 ± 5.8 degrees | 138.8 ± 0.8 degrees | 102.4 ± 9.2 degrees | 90.9 ± 2.6 degrees |
| stability of coating layer | hydrophobic layer stably adheres to substrate after having been immersed in water for 24 hours | hydrophobic layer stably adheres to substrate after having been immersed in water for 24 hours | hydrophobic layer stably adheres to substrate after having been immersed in water for 24 hours | hydrophobic layer stably adheres to substrate after having been immersed in water for 24 hours |

In comparative example 4, even using the paraffin, the modified nano-particles still can perform hydrophobic characteristic. From the result of comparative example 6, it is known that the paraffin itself has hydrophobic characteristic. The hydrophobic effect of the coating layer of comparative example 5, having a rough surface due to nano-particles surfaces of which are not modified with silane compound in the removable hydrophobic composition, is slightly better than that of comparative example 6. The hydrophobic effect of the hydrophobic layer containing the nano-particles surfaces of which are modified with the silane compound of comparative example 3 is obviously superior to that of comparative examples 5 and 6.

The concept of the present invention is also applicable to other using conditions. The following illustrates examples of the present invention that are applied to implements.

Example 3

Application in High Voltage Insulator

The removable hydrophobic composition comprises:
(1) 2 parts by weight of silicon oxide nano-particles having a diameter of 7 nm;
(2) 2 parts by weight of a toulene;
(3) 80 parts by weight of a RTV rubber; and
(4) 0.1 parts by weight of a paraffin wax.

The removable hydrophobic composition is coated on a surface of an insulator by using a paintbrush, and then is cured by a curing process at the room temperature to form a removable hydrophobic coating layer. The hydrophobic angle of the removable hydrophobic coating layer is 106.1±1.9 degrees. Adhesion effect between the removable hydrophobic coating layer and the insulator is good. After the weathering test of high temperature and high humidity (85, 95% RH) for 1000 hours, the removable hydrophobic coating layer on the surface of the insulator is not lost and stably adheres to the insulator. In addition, the hydrophobic angle of the removable hydrophobic coating layer is 104.2±0.7 degrees. The removable hydrophobic coating layer on the surface of the insulator can be directly peeled off from the smooth surface of the insulator. Then, another new the removable hydrophobic composition can be coated onto the surface of the insulator for forming another new the removable hydrophobic coating layer.

Example 4

Application in Surfaces of Shoes

The removable hydrophobic composition comprises:
(1) 2 parts by weight of silicon oxide nano-particles having a diameter of 7 nm;
(2) 10 parts by weight of a RTV rubber;
(3) 100 parts by weight of a toluene solvent; and
(4) 0.1 parts by weight of a paraffin wax.

The removable hydrophobic composition is coated on surfaces of shoes by using a paintbrush, and then is cured by a curing process at the room temperature to form a removable hydrophobic coating layer. The hydrophobic angle of the removable hydrophobic coating layer is 111.5±2.5 degrees. Adhesion effect between the removable hydrophobic coating layer and the surface of shoe is good. Even the shoes have been immersed in water for 24 hours, water still does not pass through the removable hydrophobic coating layer to get into the shoes. The removable hydrophobic coating layer can be directly peeled off from the surface of the shoe. Then, another new the removable hydrophobic composition can be coated onto the surface of the shoe for forming another new the removable hydrophobic coating layer.

Example 5

Application in Circuit Board

The removable hydrophobic composition comprises:
(1) 1 parts by weight of silicon oxide nano-particles having a diameter of 7 nm;
(2) 40 parts by weight of an acrylic polymer;
(3) 80 parts by weight of a acetic ester solvent;
(4) 0.1 parts by weight of a paraffin wax; and
(5) 1 parts by weight of a di-n-octyl phthalate.

The removable hydrophobic composition is coated on a surface of a circuit board by a spray coating method or immersion coating method, and then is cured by a curing process at 60 to form a removable hydrophobic coating layer. The hydrophobic angle of the removable hydrophobic coating layer is 91.0±1.2 degrees. Even the circuit board covered with the removable hydrophobic coating layer has been immersed in water for 168 hours, adhesion effect between the removable hydrophobic coating layer and the surface of the circuit board is good, and the removable hydrophobic coating layer stably adheres to the surface of the circuit board. The removable hydrophobic coating layer on the surface of the circuit board can be removed by immerging the circuit board in a butyl acetate solvent. Then, another new the removable hydrophobic composition can be coated onto the surface of the circuit board for forming another new the removable hydrophobic coating layer.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hydrophobic composition, comprising:
  a. 0.1-50 parts by weight of nano-particles having diameters smaller than 100 nm, surfaces of the nano-particles are modified with silane compound;
  b. 0.1-5 parts by weight of an adhesion regulator or adhesion inhibitor;
  c. 100 parts by weight of a solvent;
  d. 0.1-50 parts by weight of a polymer compound; and
  e. a polymer plasticity-adjusting agent comprises polycaprolactone polyol, di-n-octyl phthalate, triacetylgycerol, trimethyl 1,3 pentanediol, derivatives thereof or combinations thereof.

2. The hydrophobic composition according to claim 1, wherein the nano-particles comprises titanium oxide, zinc oxide, aluminum oxide, silicon oxide, mica, derivatives thereof or combinations thereof.

3. The hydrophobic composition according to claim 1, wherein the silane compound comprise hexamethyldisilazane, dimethyldichlorosilane, octyltrimethoxysilane, octamethyl cyclotetrasiloxane, ethoxy silane compound, polydimethysiloxane, tetramethyltetravinyl-cyclotetrasiloxane, derivatives thereof or combinations thereof.

4. The hydrophobic composition according to claim 1, wherein the solvent comprises alkane, aromatic, alcohol, ketone, ester, ester derivative, or combinations thereof.

5. The hydrophobic composition according to claim 4, wherein the solvent comprises ethanol, isopropyl alcohol, butane, heptane, hexane, acetone, butanone, methyl ethyl ketone, toluene, dimethylbenzene, ethyl acetate, butyl acetate, amyl acetate, derivatives thereof or combinations thereof.

6. The hydrophobic composition according to claim 1, wherein the adhesion regulator or adhesion inhibitor comprises paraffin wax, carnauba wax, bee wax, polyethylene wax, derivatives thereof or combinations thereof.

7. The hydrophobic composition according to claim 1, wherein the polymer compound comprises polyethylene, polypropylene, polyvinyl acetate, acrylic resin, polyvinyl chloride, polystyrene, silicone rubber resin, epoxide resin, polyurethane resin, derivatives thereof or combinations thereof.

8. A method for fabricating a hydrophobic coating layer, comprising:
  applying a hydrophobic composition according to claim 1;
  applying the hydrophobic composition onto a surface of a substrate; and
  after evaporating the solvent of the hydrophobic composition, the hydrophobic composition forming a hydrophobic coating layer on the surface of the substrate.

9. The method for fabricating the hydrophobic coating layer according to claim 8, further comprising after removing the hydrophobic coating layer, applying another the hydrophobic composition onto the surface of the substrate for forming another the hydrophobic coating layer.

10. A hydrophobic coating layer, which is formed by a method according to claim 8.

* * * * *